United States Patent [19]

Fong et al.

[11] Patent Number: 5,034,880

[45] Date of Patent: Jul. 23, 1991

[54] APPARATUS AND METHOD FOR EXECUTING A CONDITIONAL BRANCH INSTRUCTION

[75] Inventors: Anthony S. Fong, Southboro; Robert D. Becker, Shirley; Martin J. Schwartz, Worcester; Janis Delmonte, Somerville, all of Mass.

[73] Assignee: Wang Laboratories, Inc., Lowell, Mass.

[21] Appl. No.: 288,506

[22] Filed: Dec. 22, 1988

[51] Int. Cl.$^5$ .............................................. G06F 9/42
[52] U.S. Cl. ................................ 364/200; 364/261.5; 364/231.8; 364/938.1; 364/964.26
[58] Field of Search ................. 364/200, 900, 261.5, 364/254.5, 938.1

[56] References Cited

U.S. PATENT DOCUMENTS

| | | | |
|---|---|---|---|
| 4,179,731 | 12/1979 | Yamazaki | 364/200 |
| 4,189,770 | 2/1980 | Gannon et al. | 364/200 |
| 4,200,927 | 4/1980 | Hughes et al. | 364/200 |
| 4,254,461 | 3/1981 | Chemla et al. | 364/200 |
| 4,338,661 | 7/1982 | Tredennick et al. | 364/200 |
| 4,390,946 | 6/1983 | Lane | 364/200 |
| 4,573,118 | 2/1986 | Damouny et al. | 364/200 |
| 4,691,277 | 9/1987 | Kronstadt et al. | 364/200 |
| 4,853,840 | 8/1989 | Shibuya | 364/200 |
| 4,974,155 | 11/1990 | Dulong et al. | 364/200 |

Primary Examiner—Michael R. Fleming
Assistant Examiner—Glenn A. Auve
Attorney, Agent, or Firm—Michael H. Shanahan

[57] ABSTRACT

Apparatus for executing a conditional branch instruction in a pipelined processing unit which has an instruction queue for storing an instruction stream, address generating apparatus connected to the head of the instruction queue for generating and retaining an address defined in the portion of the instruction stream presently at the head of the instruction queue, and instruction interpretation apparatus which is also connected to the head of the instruction queue for receiving and interpreting an instruction at the head of the instruction queue. A conditional branch instruction which is presently at the head of the instruction queue is executed by first performing a dispatch operation in a first cycle which is the last cycle of execution of the instruction preceding the conditional branch instruction in the instruction queue. The dispatch operation sets up the execution of the instruction at the head of the instruction queue. One result of the dispatch operation is the generation of the address for the target instruction specified in the branch instruction. Thereupon, in an immediately following second cycle, a conditional fetch operation and a test operation are performed. The conditional fetch operation provides the address for the target instruction to the processing unit's memory. The test operation determines whether the branch is to be taken. If the branch is not to be taken, the target instruction is not loaded into the instruction queue, the cycle is extended, and a dispatch operation is performed in the extended cycle. If the branch is to be taken, the target instruction is loaded into the head of the instruction queue in the second cycle. Finally, when the branch is taken, the dispatch operation is performed in an immediately following third cycle.

11 Claims, 6 Drawing Sheets

APPARATUS AND METHOD FOR EXECUTING A CONDITIONAL BRANCH INSTRUCTION

BACKGROUND OF THE INVENTION

1. Field of the Invention

The invention described in this patent application relates to the execution of instructions in digital computer systems and more specifically to the execution of conditional branch instructions in processors having pipelined instruction execution.

2. Description of Related Art: FIG. 1

The technique of pipelining has long been employed in the computer arts to speed instruction execution. In pipelining, execution of a sequence of instructions is divided into stages and execution of different parts of the same instruction or parts of different instructions proceeds in parallel. An example of such a pipelined system is the CPU of the VS 7000 family of computer systems built by Wang Laboratories, Inc. This CPU is described in detail in U.S. patent application Ser. No. 147,053, *Information Processing System with Enhanced Instruction Execution and Support Control*, David L. Whipple, filed Jan. 22, 1988, which in turn is a continuation of U.S. patent application Ser. No. 730,977, filed May 6, 1985. FIG. 1 is a block diagram of the VS 7000 CPU. The main components of that system for purposes of the present discussion are MEM 225, which is a cache in which instructions and data being processed by the VS 7000 CPU are loaded from the system s main memory and stored while being processed by the CPU, instruction queue (IQ) 103, a queue into which fixed sized portions (IP) 109 of an instruction stream consisting of instructions to be executed are loaded from MEM 225 prior to execution, address generator (AGEN) 115, which generates addresses for MEM 225 from address information contained in the instructions, and instruction interpreter (IINT) 111, which controls operation of the VS 7000 CPU by executing microcode in response to control information contained in the instructions. As may be seen from FIG. 1, data is carried from MEM 225 to IQ 103 by data bus (DBUS) 227, while addresses are carried from AGEN 115 to MEM 225 by address bus (ABUS) 121.

The VS 7000 series machines employ a virtual memory system, that is, a very large logical address space is mapped onto a much smaller physical address space. In such systems, virtual addresses, which specify locations in the logical address space, must be translated into physical addresses specifying the locations at which the actual data or instructions are presently located in the physical address space. Thus, generation of an address in the VS 7000 series machines involves two steps: computing a virtual address and converting the virtual address to its corresponding physical address. VACOMP 112 is the component of AGEN 115 which computes virtual addresses; it is connected by VABUS 113 to virtual address register (VAR) 114 and to physical address translator (PATRANS) 116. VAR 114 operates under control of IINT 111 to retain virtual addresses placed by VACOMP 112 on VABUS 113. PATRANS 116 translates the virtual address to its corresponding physical address and, as determined by microcode operating in IINT 111, outputs the physical address to either instruction address generator (IAG) 119, which generates the address of the next portion of the sequence of instructions (IP) 109 to be loaded into queue tail (QT) 107 of IQ 103, or address register (AR) 117, which provides operand addresses to memory 225.

The pipeline of the VS 7000 system divides instruction execution into three stages: fetching an IP 109 from MEM 225 and placing it in QT 107 of instruction queue 103, generating addresses from the address information in the instruction syllables currently in queue head (QH) 105, and actually executing the instruction using control information received from QH 105 and the data addressed in the address generation stage in IINT 111. Since the fetching, address generation, and interpretation operations proceed in parallel, the VS 7000 CPU may within a single CPU cycle interpret one instruction in IINT 111, generate an address from the instruction or portion thereof currently in QH 105, and load another IP into QT 107. As is implicit in the above, there are two kinds of addresses generated by AGEN 115: addresses for IPs 109 and addresses of operands, i.e., data used in instruction execution. Corresponding to these two kinds of addresses, there are two components which receive addresses in parallel from AGEN 115. Addresses to be used for operands are received in address register (AR) 117; addresses to be used to generate instruction addresses are loaded into instruction address generator (IAG) 119. Once loaded, IAG 119 operates independently of AGEN 115 to increment the address with which it is loaded to obtain the address of the next fixed-length instruction portion to be loaded into QT 107. The address is provided to MEM 225 when there is room in IQ 103 and MEM 225 is not providing operands.

Operation of the pipeline is controlled by IINT 111. The following pipeline operations are of particular interest: dispatch, advance, and the memory operations fetch and data read. IINT 111 performs the dispatch operation on the last cycle of execution of an instruction. At that point, the first portion of the next instruction to be executed is in QH 105. The operation involves the computation of a virtual address and generation of a physical address in AGEN 115, updating of program counter registers in VACOMP 112, provision of the instruction or a beginning portion thereof to IINT 111, and advancement of IQ 103. At the end of the dispatch operation, VAR 114 contains the virtual address generated from the contents of QH 105, AR 117 contains the physical address corresponding to the virtual address, the program counter registers point to the instruction whose execution begins in the next cycle and to the following instruction, and the contents of IQ 103 which follow the original contents of QH 105 are in QH 105. IINT 111 performs the advance operation when it is interpeting an instruction which is longer than the length of QH 105. At that point, the operation code, including the format information for the instruction, is in IINT 111. Advance works as does dispatch, except that the amount by which IQ 103 is advanced is under microcode control, as is whether the virtual address computed from the contents of QH 105 at the beginning of the operation is retained in VAR 114 and the corresponding physical address in AR 117. Moreover, the contents of QH 105 are not loaded into IINT 111, and the program counter registers in VACOMP 112 are not updated.

The memory operations provide physical addresses via ABUS 121 to MEM 225 and receive instructions or data from MEM 225 in the CPU. The fetch operation uses a physical address provided by IAG 119 and loads QT 107 in IQ 103. The data read operation uses a physical address provided by AR 117 and provides the data to an input register in the CPU. With both operations, the data or instruction is available to the CPU by the end of the microcycle in which the memory operation is performed.

While the pipeline in the VS 7000 type CPU of FIG. 1 is very effective when executing a continuous sequence of instructions, its advantages become disadvantages when a conditional branch instruction must be executed. A conditional branch instruction is an instruction which causes program execution to branch to a target instruction at an address defined in the conditional branch instruction if a condition specified in the instruction is satisfied. Of course, when the branch is taken, the address of the target instruction must be computed, the program counter registers and IAG 119 must be set to point to the instruction sequence beginning with the target instruction, the target instruction must be loaded into the head of IQ 103, and any other instructions in IQ 103 must be discarded.

FIG. 1A shows one of the types of conditional branch instructions executed by the VS 7000 type CPU. Branch on condition instruction 123 is 32 bits long; the first 8 bits are an operation code (OC) 127 specifying the branch instruction; of the 8 operation code bits, bits 0-1 are an instruction type code (IT) 125 which specifies the instruction's format. Instruction 123 has the RX format, which means that it is 32 bits long and that the branch address is computed by adding a base value and a displacement value to an index value. The index and base values are kept in registers in VACOMP 112 which are specified by the values of IR field 131 and BR field 133 respectively in the instruction. DISP field 135 contains the displacement value. CMASK field 129, contains a mask for selecting the condition code bits whose values will determine whether the branch is taken.

Execution of conditional branch instruction 123 involves the following steps. Steps 1 and 2 are performed in every branch instruction; steps 3 and 4 are performed only if the branch is taken.

1. On the last cycle of execution of the instruction preceding the branch instruction (the syllables making up the branch instruction are in QH 105): performing a dispatch operation. At the end of the dispatch operation, the virtual address of the target instruction is in VAR 114, the physical address is in AR 177, the branch instruction is in IINT 111, and at least the beginning of the instruction following the branch instruction is in QH 105.

2. On the next cycle, which is the first cycle of execution of the branch instruction: testing the condition code using the mask specified in the instruction to determine whether the branch is to be taken. If the branch is not to be taken, performing a dispatch operation. If the branch is to be taken, providing the address saved in VAR 114 to PATRANS 116 to generate the physical address of the target instruction, updating the registers in VACOMP which specify the program counter, and loading the physical address into IAG 119.

3. On the second cycle of execution of the branch instruction, setting QT 107 equal to QH 105, providing the physical address in IAG 119 to MEM 225, and loading the portion of the instruction sequence specified by IAG 119 into QT 107. The effect is to load the portion of the instruction sequence beginning with the target instruction into QH 105.

4. On the third cycle of execution of the branch instruction, performing a dispatch operation.

As may be seen from the foregoing, execution of a branch which is not taken requires one cycle from the time the branch instruction is loaded into IINT 111, while execution of a branch which is taken requires three cycles, even though the branch address is available at the time the branch instruction is loaded into IINT 111. An object of the present invention is to improve on prior art pipelined systems by providing a pipelined system wherein the execution of a branch which is taken requires at most two cycles.

SUMMARY OF THE INVENTION

The invention described in the present application reduces the number of cycles required to execute the branch instruction by providing:

instruction queue means connected to the memory means for receiving portions of an instruction stream from the memory means and storing the portions prior to execution of the instructions in the portions, a beginning portion including part or all of the next instruction to be executed being at the head of the queue in a first cycle which is the last cycle of execution of the preceding instruction and the queue being responsive to a dispatch operation during the first cycle to output the beginning portion and advance a following portion contained in the instruction queue means to the head of the instruction queue means and to a conditional fetch operation to load the target instruction into the head of the queue unless completion of the conditional fetch operation is inhibited;

first address computation means connected to the head of the instruction queue and to the memory means for responding to the dispatch operation by computing an address defined in the beginning portion and retaining the address, the first address computation means operating when the beginning portion is a conditional branch instruction to compute the branch address; and instruction interpretation means connected to the head of the instruction queue means for causing performance of the dispatch operation and receiving the beginning portion in the first cycle and beginning interpretation of the beginning portion in a second cycle immediately following the first cycle, the instruction interpretation means responding in the second cycle when the beginning portion is a conditional branch instruction by performing the conditional fetch operation using the retained address and determining whether the branch condition indicates that the branch is to be taken and if the branch is not to be taken, acting in the second cycle to inhibit completion of the conditional fetch operation and to cause the dispatch operation to be performed, but if the branch is to be taken, acting in the second cycle to permit the completion of the conditional fetch operation and causing the dispatch operation to be performed in a third cycle immediately following the second cycle.

Further aspects of the invention are shown in FIGS. 2 and 5. In FIG. 2, components which have the same general function as components in FIG. 1 have the same name as in FIG. 1 The system shown in the block diagram of that figure differs from the system shown in FIG. 1 in the following pertinent respects: IAG 219 is now no longer connected to AGEN 215 in parallel with AR 217, but is instead loaded from and outputs to ABUS 221. Further, IINT 211 produces, and IQ 203 and IAG 219 respond to, a LHEAD signal 213. IQ 203 responds to the LHEAD signal by loading the data on DBUS 227 into QH 203; IAG 219 responds to LHEAD 213 by loading the address currently in AR 217. The changes permit the address computed by AGEN 215 from the address information in the branch instruction in the last cycle of execution of the preceding instruction to be provided to MEM 225 and the target instruction to be available for loading into QH 205 during the first cycle of execution of the branch instruction. If the test of the condition indicates that the branch is to be taken, IINT 211 emits LHEAD signal 213. In consequence, the target instruction is loaded into QH 205 and the branch address is loaded into IAG 219 in that cycle and IINT 211 can receive the target instruction in the following cycle. If the test of the condition indicates that the branch is not to be taken, the second cycle is automatically extended to permit execution of the dispatch operation, as shown in FIG. 5.

It is thus an object of the invention to provide an improved digital data processing system.

It is another object of the invention to reduce the time required to execute a conditional branch instruction in a pipelined processor.

It is an additional object of the invention to provide a pipelined processor in which both a conditional fetch operation and a conditional dispatch operation may be executed in a single cycle.

It is a further object of the invention to provide a method of executing a conditional branch instruction wherein execution requires one cycle if the branch is not taken and two cycles if it is.

Other advantages, objects, and features of the invention will be understood by those of ordinary skill in the art after referring to the following detailed description of a preferred embodiment and the drawings.

DETAILED DESCRIPTION OF A PREFERRED EMBODIMENT

Figure 1:
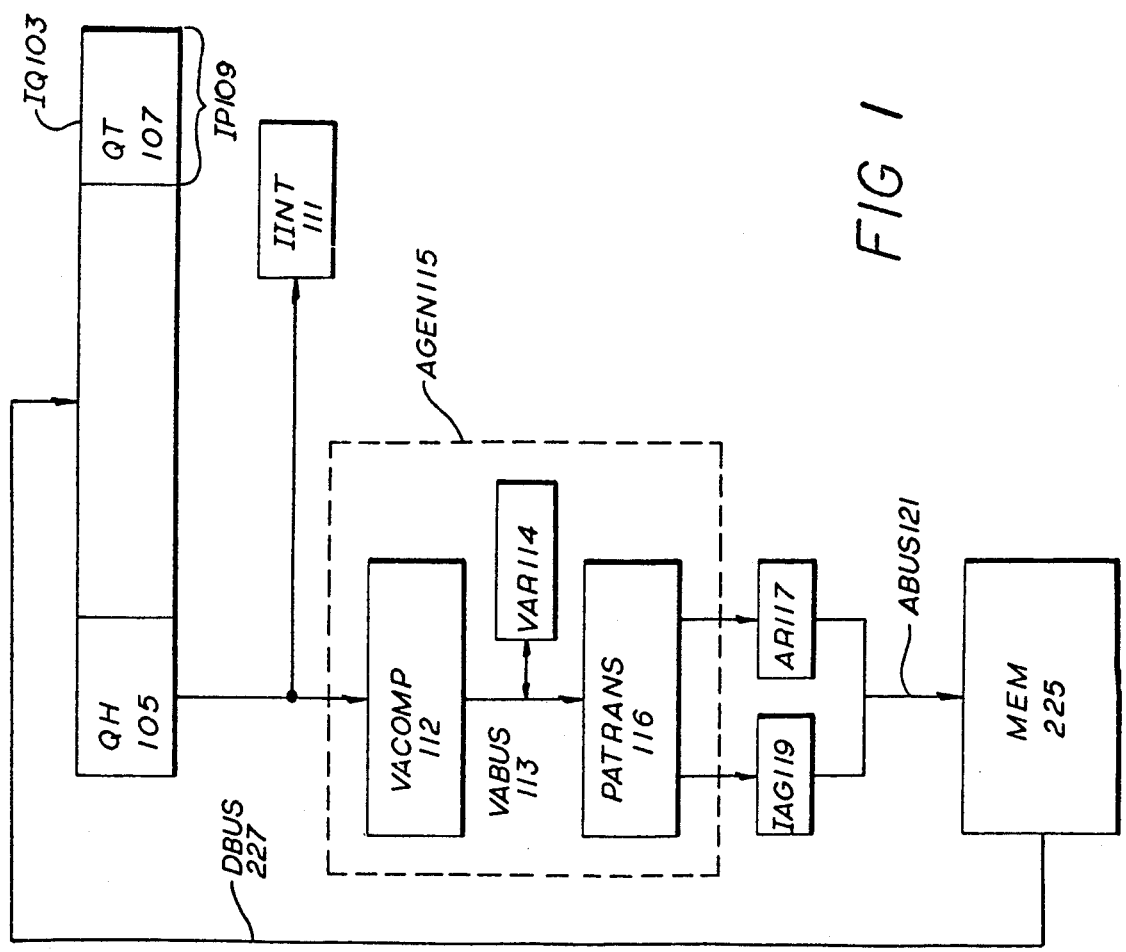
FIG. 1 is a block diagram of a prior art pipelined CPU.
Figure 1A:
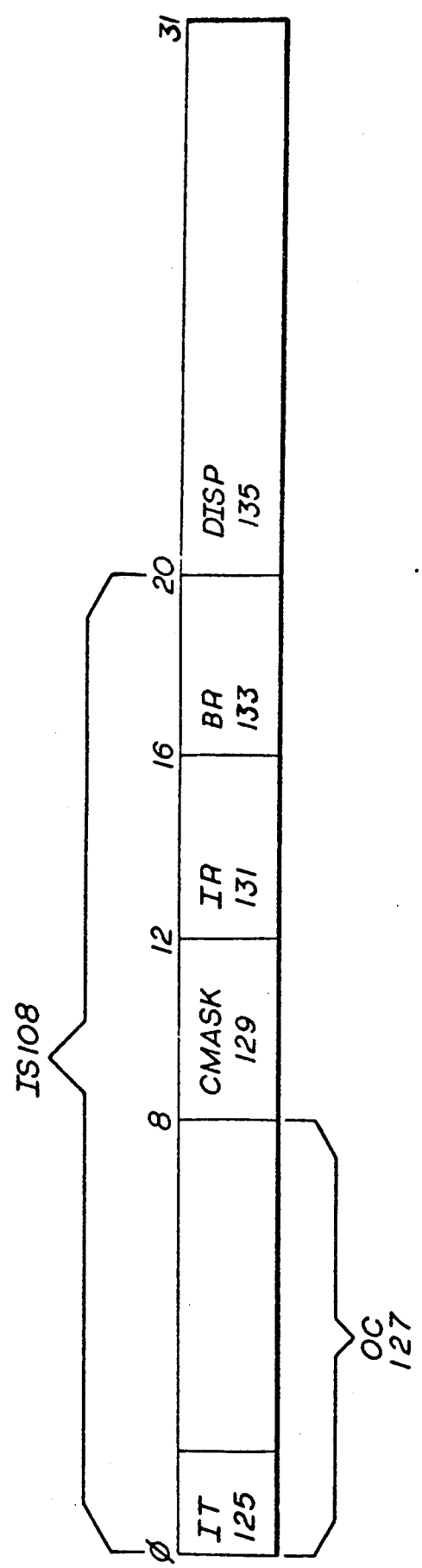
FIG. 1a is a diagram of a conditional branch instruction.
Figure 2:
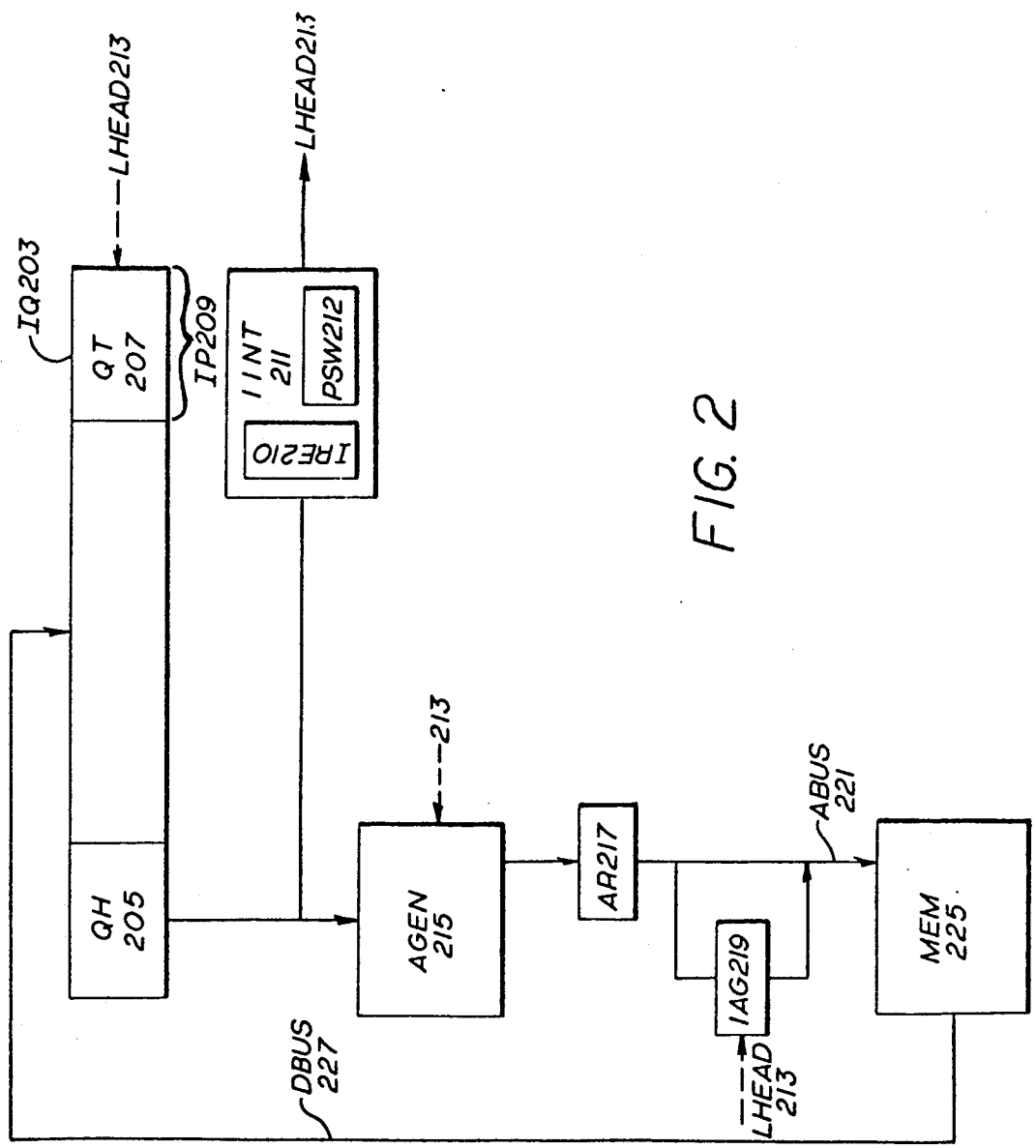
FIG. 2 is a block diagram of the pipelined CPU of the present invention.

As indicated above, FIG. 2 shows the conditional instruction execution apparatus of the invention. Components IQ 203, AGEN 215, IINT 211, and MEM 225 have generally the same functions as described with regard to FIG. 1. In IINT 211, two registers also present in IINT 111 have been added to the drawing to facilitate discussion. One of the registers, instruction register—execute (IRE) 210, is loaded with the contents of QH 205 on a dispatch operation. In a preferred embodiment, QH 205 and IRE 210 are both 32 bits wide IRE 210 is not loaded by the advance operation, and consequently, the operation code of the instruction being executed is retained in IRE throughout the execution of the instruction. The other register is program status word (PSW) register 212, which includes the condition codes which are interrogated, using CMASK 129, to determine whether a branch should be taken.

Figure 5:
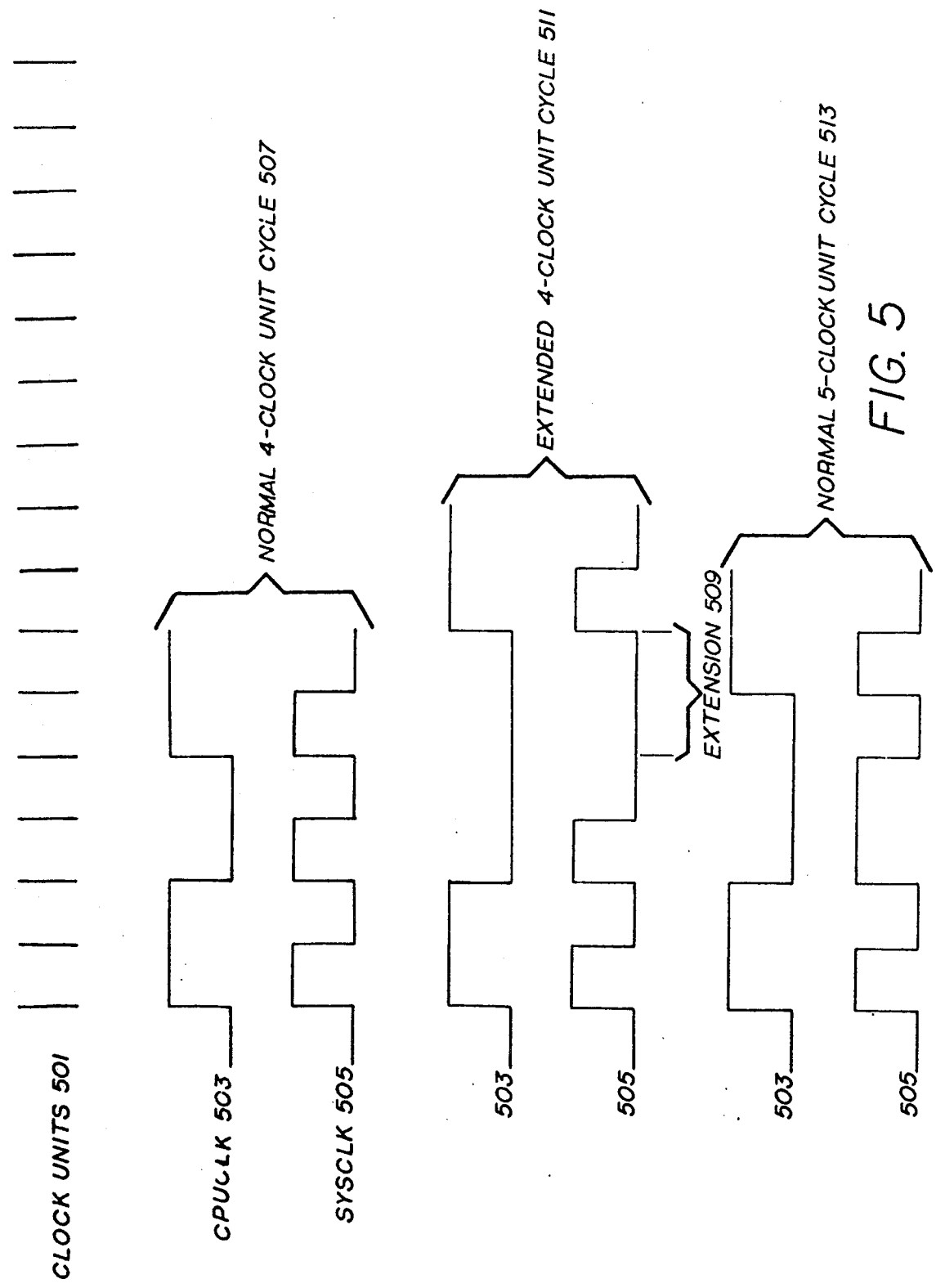
FIG. 5 is a timing diagram showing the timing of execution of microinstructions in a preferred embodiment.

Timing of operation of the apparatus of FIG. 2 is shown in FIG. 5. Timing is measured in terms of clock units 501. In a preferred embodiment, each clock unit 501 is 9.5 nanoseconds. The number of clock units used to execute a given microinstruction is microprogrammable; the programmer may specify 4 to 7 clock units 501. In addition, the occurrence of certain events such as a test for a branch which indicates that the branch is not to be taken causes the number of clock units used to execute a given microinstruction to be extended two clock units beyond the number of clock units specified for the instruction in the microcode. FIG. 5 shows a normal four-unit cycle 507, an extended four unit cycle 511, and a normal five-unit cycle 513 The signals shown in the figure are CPUCLK 503 and SYSCLK 505, both of which control operation of the CPU. As can be seen from the figure, CPUCLK 503 is a function of SYSCLK 505 in that each rising edge of CPUCLK 503 occurs on a rising edge of SYSCLK 505 and the next falling edge of CPUCLK 503 occurs on the next rising edge of SYSCLK 505. As shown in extended four-unit cycle 511, extension 509 appears in SYSCLK 505 as an extension by two clock units 501 of the time between the occurrence of the second falling edge in SYSCLK 505 and the third rising edge in that signal. When, on the other hand, the microprogram specifies a cycle of more than four clock units, the additional time is added by extending the time between the occurrence of the second rising edge in SYSCLK 505 and the next falling edge.

The improved branch instruction execution of the invention is made possible by the following factors:

1. When IINT 211 is interpreting a conditional branch instruction and the condition indicates that the branch is to be taken, IINT 211 generates LHEAD signal 213.

2. In response to LHEAD 213, IQ 203 loads QH 205 from DBUS 227 and AGEN 215 updates registers which specify the program counter from VAR 214.

3. AR 217 may be used as the source of addresses for both operands and instructions.

4. IAG 219 is no longer connected to AGEN 215 in parallel with AR 217, but in series.

5. IAG 219 loads the present contents of AR 217 in response to LHEAD signal 213.

6. When the test of the condition indicates no branch, the microinstruction execution cycle is automatically extended by two clock units 501, permitting execution of a dispatch operation.

Execution of a branch instruction in the apparatus of FIG. 2 proceeds as follows:

1. On the last cycle of execution of the instruction preceding the branch instruction (the branch instruction is in QH 205): performing a dispatch operation. As a result, the branch instruction is in IRE 210 and the physical address of the target instruction is in AR 217.

2. On the next cycle, which is the first cycle of execution of the branch instruction: performing a conditional fetch operation in which the address in AR 217 is presented to MEM 225 and the specified instruction is output to QH 205, testing the condition code in PSW 212 as specified by CMASK 129, and If the test indicates that no branch is to be taken:
performing the dispatch operation in extension 509 resulting from the occurrence of the test indicating no branch.

If the test indicates that a branch is to be taken: generating the LHEAD signal, to which IQ 203 responds by loading the target instruction from MEM 225 into QH 205 and updating QT 207 to invalidate the portion of IQ 203 following the portion that was loaded, AGEN 215 responds by updating the registers specifying the program counter, and IAG 219 responds by loading the address of the target instruction from PAR 423.

3. On the second cycle of execution of the branch instruction, which is required only if the branch is taken, performing the dispatch operation.

As may be seen from the foregoing, when no branch is taken, the branch instruction is executed in a single cycle; when the branch is taken, execution requires only two cycles.

Figure 3:
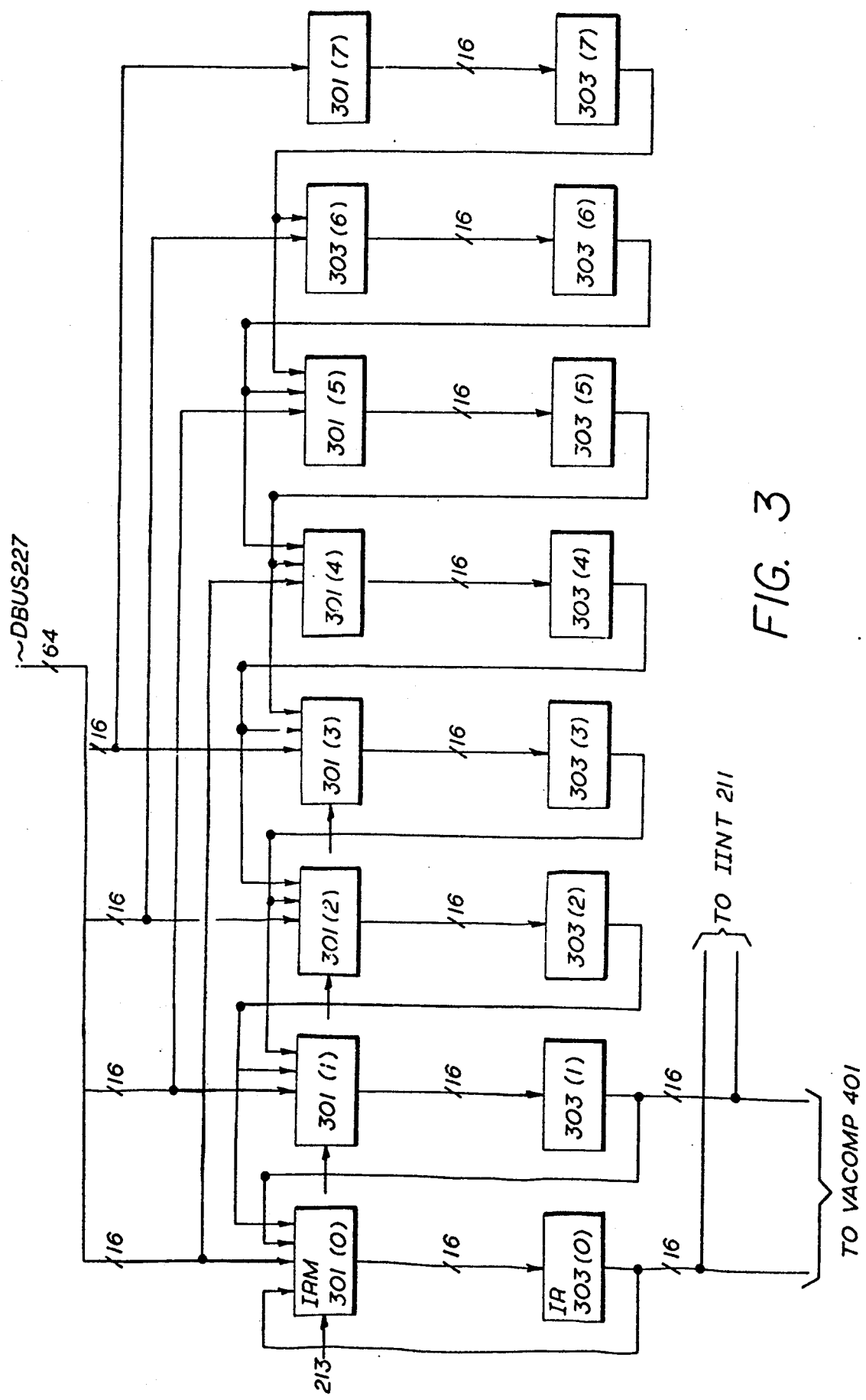
FIG. 3 is a logic diagram of IQ 203 of FIG. 2.

Continuing with further detail concerning a preferred embodiment of the branch instruction execution apparatus of the present invention, FIG. 3 shows IQ 203. In the preferred embodiment, IQ consists of eight 16-bit instruction registers (IR) 303(0 . . . 7), and can thus hold four 32-bit words worth of instructions. IRs 303(0 . . . 1) have outputs connected to AGEN 215 and to IINT 211 and thus implement QH 205. Each register has an instruction register mux (IRM) 301 which selects an input for loading the registers. Possible inputs are from the next two succeeding IRs 303 in the queue and from DBUS 227, which is 64 bits wide in a preferred embodiment. As may be seen from the foregoing, the IRMs 301 permit the following operations:

1. Loading of any four contiguous registers of IR 301(0 . . . 7) from DBUS 227.
2. Loading of each IR 301 from either the first or second following IR 301 in the queue.

IR 301(0 . . . 3) are loaded in response to LHEAD signal 213, which IINT 211 generates when the condition test indicates that the branch is to be taken. QT 207 may be at any of IR 301(0 . . . 7). When QT 207 is at any of IR 301(0 . . . 3) and MEM 225 is not being used, IAG 219 generates the address of the next instruction portion 209 to be loaded into the IR 301 specified by QT 207 and the three following IRs 301. The loading of each IR 301 from the following IRMs 301 permits dispatch and advance operations which advance IQ 203 by either 16 or 32 bits. As pointed out in the discussion of the prior art, the amount by which IQ 203 is advanced in the dispatch operation is determined by the instruction type bits (IT 125) in opcode (OC) 127 of the instruction which is at the head of IQ 203 at the time of the dispatch operation. In the advance operation, on the other hand, the size of the advance is determined from IT 125 in OC 127 of the portion of the instruction presently contained in IRE 210 in IINT 211.

Figure 4:
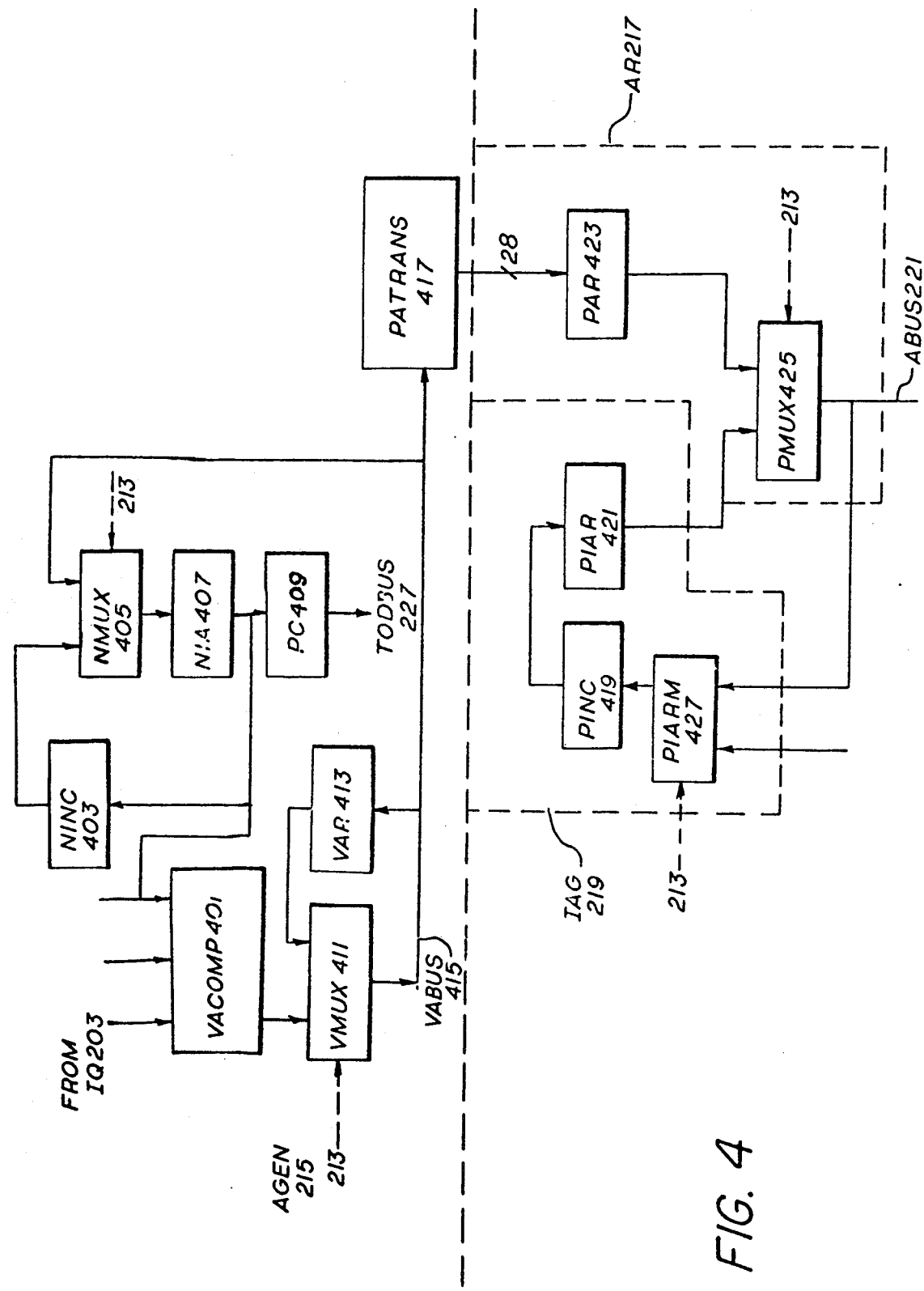
FIG. 4 is a detailed block diagram of AGEN 215, IAG 219, and AR 217 of FIG. 2.

Continuing with the preferred embodiment of AGEN 215, AR 217, and IAG 219, that is shown in FIG. 4, and beginning with AGEN 215, as previously explained, AGEN 215 has two main components, VACOMP 401, which computes virtual addresses using information in the instructions and the contents of registers in VACOMP 401, and PATRANS 417, which translates virtual addresses output onto VABUS 415 into their corresponding physical addresses. The sources of virtual addresses for VABUS 415 are VACOMP 401 and VAR 413, which is loaded from VABUS 415 under control of IINT 111 Selection of the source is by VMUX 411, again under control of IINT 111.

Also included in AGEN 215 in a preferred embodiment are the program counter registers. The first of these is NIA 407, which contains the virtual address of the next instruction to be executed. NIA 407 recieves inputs via NMUX 405 from VABUS 415 and NINC 403. Outputs from NIA 407 go to VACOMP 401, where they are used to compute target addresses which are expressed in a branch instruction as an offset from the current program counter, and to PC 409, which contains the current program counter, i.e., the virtual address of the instruction presently being executed. PC 409 has an output to DBUS 227, permitting the contents of PC 409 to be saved in MEM 225. NINC 403 is an incrementer which operates in a dispatch operation to increment the value presently in NIA 407 by the size of the instruction presently in QH 105.

Operation of these registers is as follows: in a dispatch operation, the contents of NIA 407 are output to PC 409 and to NINC 403, which increments the contents as required for the length of the instruction being dispatched, and returns them to NIA 407. Thus, at the end of the dispatch operation, PC contains the virtual address of the instruction currently being executed and NIA 407 contains the virtual address of the next instruction in IQ 203. If a branch instruction is being executed and the branch is to be taken, LHEAD signal 213 causes VMUX 411 to select VAR 413 as the input to VABUS 415 and NMUX 405 to select VABUS 415 as the input to NIA 407. NIA 407 is thus loaded with the virtual address of the target instruction.

Continuing with AR 217 and IAG 219, AR 217 includes physical address register (PAR) 423, which contains the last physical address output by PATRANS 417 and physical address mux (PMUX) 425, which selects an instruction address generated by IAG 219 or an address from PAR 423 for output to MEM 225 via ABUS 221. IAG 219 includes physical instruction address register (PIAR 421, which contains the address of the next 64 bits of instruction stream to be loaded into QT 207, PIAR mux (PIARM) 427 which selects physical addresses input to IAG 219 from ABUS 221 and another source which is not of interest to the present discussion, and PINC 419, which increments the physical address received from PIARM 427 by two 32-bit words before providing it to PIAR 421.

Operation of the preferred embodiments of AR 217 and IAG 219 is as follows: On any dispatch operation, the virtual address computed from the instruction portion presently in QH 205 is retained in VAR 413 and the physical address corresponding to that virtual address is output to PAR 423, PC 409 is loaded from NIA 407, PINC 419 increments the value of NIA 407 by the amount required for the instruction at the head of IQ 203, and the incremented value is loaded into NIA 407. When the instruction is a conditional branch instruction, IINT 211 performs a conditional fetch operation in the next cycle. In that operation, PMUX 425 selects PAR 423 as the input to ABUS 221. Otherwise, in cycles in which no memory data operation operation is performed and there is room in IQ 203, a fetch operation is performed. In that operation, PMUX 425 selects PIAR 421 as the input to ABUS 221, which thereby provides address for the two words of instructions being loaded into IQ 203. Whenever PIAR is enabled as the input to ABUS 221, PIARM 227 selects ABUS 221 as the input to PINC 419, whereby the address of the two words of instructions being loaded into IR 303(4 . . . 7) is incremented by those two words before being returned to PIAR 421. PMUX 425 responds to LHEAD signal 213 by selecting PAR 423, which at that point still contains the address of the target instruction, as the input for ABUS 221 and PIARM 427 responds to that signal by selecting ABUS 221 as the input to PINC 419. As a consequence, the address of the target instruction, incremented by two words, is loaded into PIAR 421.

The foregoing Detailed Description of a Preferred Embodiment has shown how the method and apparatus for executing a conditional branch instruction of the present invention permit execution of a branch instruction when the branch is taken in two cycles, rather than three. The preferred embodiment disclosed herein is, however, only one possible embodiment of the invention, which may be embodied in other forms without departing from the spirit thereof. For example, the invention may be employed with conditional branch instructions having sizes and formats other than those of conditional branch instruction 123, may be employed in systems which do not require virtual-to physical address translations, or which have no cache, but instead make references directly to system memory, and may employ other implementations of IQ 203, of the program counter registers, and of IAG 219 and AR 217. Thus, the preferred embodiment disclosed herein is to be considered in all respects illustrative and not restrictive, the scope of the invention being indicated by the appended claims rather than the foregoing Description, and all changes which come within the meaning and range of equivalency of the claims are intended to be embraced therein.

What is claimed is:

1. Apparatus for executing a conditional branch instruction for use in a computer system of the type that includes memory means for storing data, including instructions, the memory means further including means for providing the stored data in response to a memory address, the conditional branch instruction defining a branch condition and a branch address of a target instruction, the apparatus for executing a conditional branch instruction comprising:

instruction queue means coupled to the memory means for receiving an instruction stream therefrom and including means for storing portions of the instructions prior to execution of the instructions, wherein a beginning portion of an instruction includes a part or all of a next instruction to be executed, the beginning portion being stored, during a first cycle which is a last cycle of execution of a preceding instruction, at a head of the instruction queue means, the instruction queue means further including means, responsive to an occurrence of a dispatch operation during the first cycle, for outputting the beginning portion and for advancing a following portion contained in the instruction queue means to the head of the instruction queue means, the instruction queue means further including means, responsive to an occurrence of a conditional fetch operation, for loading a target instruction of the conditional fetch operation into the head of the instruction queue means unless completion of the conditional fetch operation is inhibited;

first address computation means, coupled to the head of the instruction queue means and also to the memory means, for responding to the dispatch operation, the first address computation means including means for computing an address defined in the beginning portion and also including means for retaining the computed address, the first address computation means, when the beginning portion is associated with a conditional branch instruction, to compute a branch address; and instruction interpretation means, coupled to the head of the instruction queue means and to the first address computation means, for causing performance of the dispatch operation, the instruction interpretation means including means for receiving the beginning portion in the first cycle and, responsive to the receipt of the beginning portion within the first cycle, for initiating an interpretation of the beginning portion in a second cycle immediately following the first cycle, the instruction interpretation means further including means, responsive during the second cycle when the beginning portion is interpreted to be a conditional branch instruction, for performing a conditional fetch operation using the retained computed address and for determining whether a branch condition indicates that the conditional branch is to be taken, wherein if the conditional branch is determined not to be taken, the instruction interpretation means includes means for inhibiting, during the second cycle, a completion of the conditional fetch operation and for causing instead the dispatch operation to be performed, or if the conditional branch is determined to be taken, the instruction interpretation means includes means for permitting, during the second cycle, a completion of the conditional fetch operation and for causing the dispatch operation to be performed during a third cycle that immediately follows the second cycle.

2. The apparatus for executing a conditional branch instruction set forth in claim 1 and wherein:

the second cycle is automatically extended when a branch condition indicates that the conditional branch is not to be taken and the dispatch operation is performed during the second cycle while the second cycle is extended.

3. The apparatus for executing a conditional branch instruction set forth in claim 1 and wherein:

the instruction interpretation means provides a load head signal during the second cycle when a conditional branch is to be taken and the instruction queue means includes means, responsive to the load head signal, for loading a target instruction of the conditional branch instruction into the head of the instruction queue means during the second cycle.

4. The apparatus for executing a conditional branch instruction set forth in claim 1 and further comprising:

second address computation means coupled to the first address computation means and to the memory means for receiving the retained computed address from the first address computation means and for computing an address of a next portion of the instruction stream to be added to a tail of the instruction queue means, the second address computation means including means for providing the address of the next portion to the memory means at a later time and wherein, when a conditional branch is determined to be taken, the first address computation means provides the retained stored address to he second address computation means during the second cycle.

5. The apparatus for executing a conditional branch instruction set forth in claim 4 and wherein:

the target instruction is located at a beginning of an instruction portion and wherein the target instruction is of a type having a length that permits the entire target instruction portion to be loaded into the instruction queue means; and the second address computation means includes means for responding to the load head signal by loading and incrementing the retained computed address so as to point to an instruction portion, stored within the memory means, that follows the instruction portion loaded into the instruction queue means in response to the load head signal.

6. The apparatus for executing a conditional branch instruction set forth in claim 1 and wherein:

the computer system employs virtual addresses to specify the location of data in the system and physical addresses corresponding to the virtual addresses to address the data stored in the memory means; and the first address computation means includes virtual address computation means coupled to the head of the instruction queue means for responding to a dispatch operation by computing a virtual address defined in the beginning portion of an instruction, the virtual address computation means further including means for retaining and outputting the computed virtual address, and physical address transformation means coupled to the virtual address computation means and to the memory means, the physical address transformation means being responsive to a dispatch operation and including means for receiving the computed virtual address, means for generating a physical address corresponding to the computed virtual address, means for retaining the corresponding physical address, and means responsive to a conditional fetch operation for providing the retained physical address to the memory means.

7. The apparatus for executing a conditional branch instruction set forth in claim 6 and wherein:

the instruction interpretation means provides a load head signal during the second cycle when a conditional branch is to be taken and the instruction queue means responds to the load head signal by loading the target instruction into the head of the instruction queue means during the second cycle.

8. The apparatus for executing a conditional branch instruction set forth in claim 6 and further comprising:

second address computation means coupled to the physical address computation means and to the memory means, the second address computation means including means for receiving the retained physical address during a second cycle when a conditional branch is taken, means for computing a physical address of a next portion of the instruction stream to be added to a tail of the instruction queue means, and means for providing the computed physical address to the memory means at a later time.

9. The apparatus for executing a conditional branch instruction set forth in claim 8 and wherein:

the instruction interpretation means includes means, coupled to the second address computation means, for providing a load head signal thereto during a second cycle when a conditional branch is to be taken;

the target instruction is located at a beginning of an instruction portion and wherein the target instruction is of a type having a length that permits the entire target instruction portion to be loaded into the instruction queue means; and the second address computation means includes means, responsive to the load head signal, for loading and incrementing the retained physical address to point to an instruction portion in the memory means following the instruction portion loaded into the instruction queue means in response to the load head signal.

10. The apparatus for executing a conditional branch instruction set forth in claim 6 and wherein:

each instruction includes format information at the beginning of the instruction, the format information specifying a length of and a type of instruction;

the virtual address computation means includes instruction address means responsive to the format information and to an occurrence of a dispatch operation for computing and retaining the virtual address of a next instruction in the instruction queue means; and the virtual address computation means includes means, responsive to a conditional branch being taken, for loading, during the second cycle, the instruction address means with the retained virtual address.

11. The apparatus for executing a conditional branch instruction set forth in claim 10 and wherein:

the instruction interpretation means includes means, coupled to the virtual address computation means, for providing a load head signal thereto during a second cycle when a conditional branch is to be taken, and wherein the virtual address computation means includes means for loading the instruction address means in response to the load head signal.

* * * * *